United States Patent Office 3,549,728
Patented Dec. 22, 1970

3,549,728
PHOSPHORUS AND NITROGEN-CONTAINING POLYOLS
Daniel Balde, Issy-les-Moulineaux, and Georges Nagy, Montrouge, France, assignors to Societe Anonyme Ugine Kuhlmann, Paris, France, a corporation of France
No Drawing. Filed Feb. 7, 1967, Ser. No. 614,400
Claims priority, application France, Feb. 14, 1966, 45,562; Nov. 7, 1966, 82,751
Int. Cl. C07f 9/08; C09k 3/02; C08g 22/44
U.S. Cl. 260—932
1 Claim

ABSTRACT OF THE DISCLOSURE

Polyols containing nitrogen and phosphorus having the formula

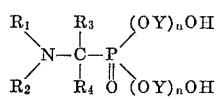

where $R_1$ and $R_2$ are hydrocarbons or the radical

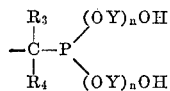

$R_3$ and $R_4$ are hydrogen or hydrocarbons, Y is an alkylene or substituted alkylene, and $n$ is an integer from 1 to 10, as well as the process of preparing the polyols. The polyols are useful as transfer liquids, hydraulic liquids, lubricants, plasticizers and as a starting material for a polyurethan resin.

THE PRIOR ART

In French patent specification No. 1,431,207 (Farbenfabriken Bayer A.G.) there are described polyols containing phosphorus and nitrogen, which are obtained by a Mannich condensation between a ketone, an aldehyde or formol, a primary or secondary amine, and an aqueous solution comprising compounds issued from the reaction of phosphorous acid with alkylene oxides. The products of this process are a mixture comprising:

(i) Tetrols or diols containing phosphorus and nitrogen.
(ii) Polyalkylene glycols formed in the course of the oxyalkylation of phosphorous acid in an aqueous medium, by reaction of the alkylene oxide with water in the presence of acid.
(iii) Small residual uneliminated quantities of amine or carbonyl compound.
(iv) Possibly phosphites or phosphonates of amines obtained by hydrolysis of phosphorous esters in the course of the Mannich condensation in an aqueous medium.

This product is a mixture of polyols (phosphorated or otherwise), the mean functionality of which is between two and four hydroxyl groups per molecule, which is low for the production of rigid foams.

As compared with the products of this prior invention, the new polyols according to the present invention are defined producs of which the molecular formulae are known. A group of preferred polyols according to the invention consists in pure hexols containing no non-phosphorated hydroxylated by-products. As a result of these differences, said hexols have a higher phosphorus content (more than 10%, as opposed to the 8% of the prior polyols) and a substantially higher phosphorous content per hydroxyl function (0.5 P/OH as opposed to 0.35 P/OH of the prior polyols), and it is possible using them to incorporate into, for example, polyurethane foam, a higher quantity of phosphorus, thus giving better fire-proofing qualities.

The new and advantageous polyols according to the present invention are of the following general Formula I:

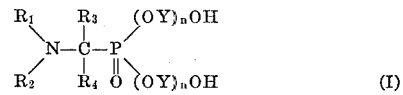

in which $R_1$ and $R_2$, which may be the same or different, are alkyl, cycloalkyl, arylalkyl, aryl, alkylaryl, hydroxyalkyl, or hydroxypolyalkoxyalkyl groups, which may be substituted, or alkanephosphonic ester groups; $R_3$ and $R_4$, which may be the same or different, are hydrogen atoms or monovalent organic groups; Y is an alkylene group of the type:

$$-\text{CH}-\text{CH}_2-$$
$$\;\;\;\;\;\;|$$
$$\;\;\;\;\;\;R$$

in which R is a hydrogen atom, an alkyl group, or a haloalkyl group and may have a different meaning in each of the Y groups; and $n$ is a number between 1 and 10.

The substituents of the $R_1$ and/or $R_2$ groups may be halogen atoms, or other groups corresponding to the formula:

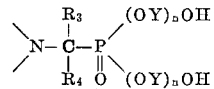

in which $R_3$, $R_4$, Y, and $n$ have the same meanings as above.

A group of preferred polyols according to the present invention are those of the general formula:

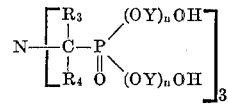

In these preferred polyols, $R_3$ and $R_4$ are most preferably hydrogen.

According to the invention, there is also provided a process for the production of the polyols of the above general Formula I which comprises reacting an alkylene oxide or a mixture of alkylene oxides and an aminoalkanephosphonic acid of the general Formula II:

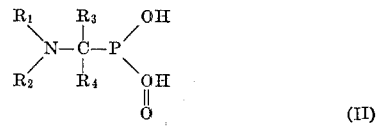

in which $R_1$, $R_2$, $R_3$, and $R_4$ have the same meaning as above, while in addition $R_I$ and $R_2$ may be hydrogen atoms.

The aminoalkanephosphonic acids of the general Formula II may be obtained by a method which comprises condensing together:

(i) Orthophosphorous acid or an ester thereof;
(ii) An aldehyde or ketone; and
(iii) Ammonia, or a primary or secondary amine or polyamine.

In the case where a phosphorous acid ester is used the phosphonic acid ester produced is subsequently hydrolyzed. The reaction is preferably carried out in an aqueous medium and in the presence of halide ions. This method is described in French patent specification No. 1,342,412, and by Petrov in the Russian Journal of General Chemistry, 29 (1959) p. 591.

However, a preferred and novel method of preparation of the aminoalkanephosphonic acids of general Formula II comprises condensing together in an aqueous medium:

(i) Phosphorus trichloride;

(ii) An aldehyde or ketone;
(iii) Ammonia or a primary or secondary amine.

This method is advantageous because of the relative cheapness of phosphorus trichloride.

The oxyalkylation according to the invention of the aminoalkanephosphonic acids of Formula II may be effected without solvent in an autoclave, by injecting the alkylene oxide into the molten acid, or into the acid in pulverulent form or disposed in a determined quantity of polyol by injecting the two reagents in to a fraction of polyol or by injecting into the alkylene oxide the acid in molten form or dispersed in a small quantity of alkylene oxide or of the corresponding polyol.

The oxyalkylation may also be effected in the presence of an inert solvent or diluent, such as dioxane, ethyl acetate, dimethylsulphoxide, or hexamethylphosphoro-triamide.

The oxyalkylation reaction is preferably effected at temperatures between 0° and 150° C., most preferably between 50 and 130° C., at ordinary or elevated pressure.

The oxyalkylation reaction is autocatalytic. The free acid functions of a molecule first catalyse the polyaddition, and then the last —P—OH group is neutralised by the addition of a single molecule of alkylene oxide. Without limiting the invention by theoretical explanation, it is thought that the autocatalytic action is effective only at the level of the phosphonic group, so that a compound is obtained which comprises the following groups (III):

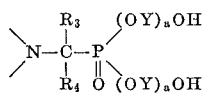

in which $a$ has a variable mean value depending on the Y group utilised; this value is generally between 1 and 4.

The pursuit of the oxyalkylation of the polyols containing phosphorus and nitrogen which are thus obtained necessitates the use of catalysts such as $BF_3$ and may be effected in known manner under ordinary polyol oxyalkylation conditions.

The phosphorus and nitrogen containing polyols according to the invention are generally in the form of viscous, colourless or slightly coloured liquids. Because of the presence of phosphorus, nitrogen, and possibly halogens, they are particularly suitable for the preparation of flame-resistant plastics, such as polyurethane foams and polyester resins. Their high functionality makes them particularly suitable for the preparation of rigid polyurethane foams having excellent mechanical properties. For instance, the preferred polyols according to the invention are almost pure hexols, which are very advantageous in the production of polyurethane foams owing to their high cross-linking power, which is superior to that of comparable diols and tetrols. Their phosphorus content per hydroxyl function is usually much greater than that of phosphorus containing polyols known at present, thus making it possible for more phosphorus to be incorporated in the foams and the fire-resistant properties thereof to be enhanced. In addition, the polyols of the invention may be used together with all polyols usually employed in the preparation of polyurethane foams, thus making it possible to vary the physical properties of the foams prepared. The compounds of the invention have in addition been found useful as constituents of transfer liquids, hydraulic liquids, lubricants, and plasticisers. The following examples illustrate the present invention without limiting its framework and scope.

Example 1

299 parts of aminotrimethane-phosphonic acid, the preparation of which is described in Examples 8 and 9, are introduced into an autoclave. Heating is applied with agitation in an inert atmosphere to a temperature of 120° C. and propylene oxide is progressively injected. At the beginning the reaction is very slow and not very exothermic, and then gradually, in proportion as the reaction proceeds, the oxyalkylation becomes easier so that the flow of propylene oxide can be increased. Over a period of five hours, about 670 parts of propylene oxide are injected. The temperature of 120° C. is maintained for a further hour to complete the reaction. The reaction mixture is cooled, and, if necessary, filtered. After elimination in vacuum of the volatile fractions, 910 parts of polyol are obtained, which corresponds to the fixation of 10.5 mols of propylene oxide per mol of aminotrimethane-phosphonic acid.

The polyol obtained has the following characteristics:

Viscous, clear yellow liquid.
Acid value—<0.1.
Hydroxyl value—370.
Phosphorus content—10.2%.
Nitrogen content—1.5%.

Example 2

299 parts of aminotrimethane-phosphonic acid, the preparation of which is described in Examples 8 and 9, are dissolved in 300 parts of dimethylsulphoxide are introduced into an autoclave. At 70° C. propylene oxide is injected progressively. At the beginning of the reaction the oxyalkylation is slow, but then accelerates and becomes sufficiently exothermic to bring the temperature of the reaction mixture to 100° C. A total of 700 parts of propylene oxide is injected, and the temperature of 100° C. is maintained for two hours to complete the reaction. After the volatile products and the solvent have been driven off in a suitable vacuum (90°/0.5 mm.), 905 parts of a phosphorus and nitrogen containing polyol are obtained which has substantially the same characteristics as the polyol obtained in Example 1.

Example 3

The procedure is as in Example 2; about 650 parts of ethylene oxide are injected into a solution of 299 parts of aminotrimethane-phosphonic acid, the preparation of which is described in Examples 8 and 9, in 300 parts of dimethylsulphoxide.

After topping, 900 parts of phosphorus containing polyol are obtained, which corresponds substantially to the fixing of 13.5 mols of ethylene oxide per mol of acid.

The product obtained has the following characteristics:

Viscous yellow liquid.
Acid value—0.2.
Hydroxyl value—380.
Phosphorus content—10.4%.
Nitrogen content—1.55%.

Example 4

The procedure is as in Example 2; a suspension of 299 parts of aminotri(methane-phosphonic) acid, the preparation of which is described in Examples 8 and 9, in 200 parts of dioxane is formed.

After oxypropylation, 910 parts of a polyol identical to that prepared in Example 2 are obtained. 2 parts of an ether-boron trifluoride complex are added to the polyol obtained, and oxypropylation is resumed at about 130° C. About 400 parts of propylene oxide are injected and then the residual volatile products are driven off, 1,250 parts of polyol being obtained, which corresponds to the total fixation of about 16.5 mols of propylene oxide per mol of aminotri(methane-phosphonic) acid.

This polyol has the following characteristics:

Light yellow liquid of medium viscosity.
Acid value—<0.1.
Hydroxyl value—280.
Phosphorus content—7.4%.
Nitrogen content—1.55%.

Example 5

700 parts of propylene oxide are introduced into an autoclave. A paste containing 299 parts of aminotri(methane-phosphonic) acid, the preparation of which is described in Examples 8 and 9, and 150 parts of the phosphorus containing polyol obtained in accordance with Experiment 1 are injected at 120° C., with agitation. In the course of the addition the pressure in the autoclave decreases progressively, dropping from about 8 bars to a final pressure of 2 bars. On completion of the addition, the temperature of 120° C. is maintained for two hours and then the product is topped. 1,060 parts of phosphorus containing polyol are obtained which has the same characteristics as the product obtained in Example 1.

Example 6

The same procedure as in Example 1 is followed. 199 parts of di(hydroxyethyl)-aminomethanephosphonic acid are subjected to oxypropylation. A total of 360 parts of propylene oxide are injected, and after topping there are obtained 520 parts of polyol, which corresponds approximately to the fixation of 5.5 mols of propylene oxide per mol of di(hydroxymethyl)-aminomethane-phosphonic acid.

The polyol obtained has the following characteristics:

Viscous, orange-coloured liquid.
Acid value—<0.1.
Hydroxyl value—430.
Phosphorus content—6%.
Nitrogen content—2.7%.

Example 7

Following the procedure of Example 1, 436 parts of ethylenediaminotetra(methanephosphonic) acid are subjected to oxypropylation. A total of 950 parts of propylene oxide are injected, and after topping there are obtained 1,245 parts of phosphorus containing polyol, which corresponds substantially to the fixation of 14 mols of propylene oxide per mol of acid.

The polyol obtained has the following characteristics:

Highly viscous yellow liquid.
Acid value—<0.1.
Hydroxyl value—360.
Phosphorus content—10%.
Nitrogen content—2.2%.

Example 8

Preparation of aminotri(methane-phosphonic) acid.—
350 g. of water are placed in a 2 litre glass reactor equipped with a thermometer, a reflux condenser, a dropping funnel, and an agitation device, and then 413 g. of phosphorus trichloride (3 mols) are introduced progressively over a period of one hour.

During the addition of the first two-thirds of the phosphorus trichloride, there is no liberation of hydrochloric acid and the reaction is very exothermic. The temperature of the reaction mixture is maintained at about 50–60° C. On the addition of the last third of the phosphorus trichloride, hydrochloric acid is released and the exothermicity decreases.

A clear, very slightly yellowish solution is obtained to which a solution of ammonia (22 or 22° Baumé) containing 1 mol of ammonia is added in the course of 15 minutes.

On completing the addition, the mixture is heated with reflux and 332 g. of a 30% aqueous solution of formol (3.33 mols of formol) are added progressively over a period of 45 minutes.

Reflux conditions are maintained for 4 hours and the mixture is then concentrated to 300 g.

In the course of the cooling the aminotrimethanephosphonic acid crystallises slowly.

After draining and drying, 220 g. of aminotrimethanephosphonic acid are obtained.

Yield of the first crystallisation: 74% of theory.

Example 9

Preparation of aminotri(methane-phosphonic acid.—
The following substances are placed in a 1 litre glass reactor equipped with a thermometer, a reflux condenser, a dropping funnel, and agitation means.

Ammonia 4.16N—80 ml. (0.33 mol).
Formol in 30% aqueous solution—111 g. (1.1 mol).
137.5 g. of phosphorus trichloride (1 mol) are added progressively through the funnel, allowing the temperature to rise to about 70° C.

On completion of the addition, reflux conditions are maintained for 5 hours and the mixture then concentrated to 125 g.

The aminotrimethanephosphonic acid precipitates slowly in the cold state.

After drying, 77 g. of aminotrimethanephosphonic acid are obtained.

Yield of the first crystallisation: 77% of theory.

Example 10

A rigid polyurethane foam was prepared by proceeding in the following manner:

The following products were mixed in a 500 ml. stainless steel beaker by means of a stainless steel agitator equipped with a three-bladed screw of a diameter of 3 cm., rotating at 1000 r.p.m.:

| | Parts |
|---|---|
| Polyol obtained in Example 1 | 96 |
| Silicone lubricant (available on the market under the name DC 113) | 2 |
| Triethylenediamine | 3 |
| Stannous octoate | 0.5 |
| Trichloromonofluoromethane | 30 |

90 parts of polyphenylene-polyisocyante (7.5 isocyanate functions per kg.) were then added, and after agitation the mixture was poured into a mould of 20 x 20 x 20 cm.

A foam containing 4.2% of phosphorus was obtained which had a good structure, excellent mechanical properties, and which was classified as non-inflammable by the ASTM–D 1692–59 T test.

Example 11

A rigid polyurethane foam was prepared using the same process as in Example 10 and utilising the following components:

| | Parts |
|---|---|
| Polyol obtained in Example 1 | 100 |
| Silicone lubricant (DC 113) | 2 |
| Triethylenediamine | 3 |
| Stannous octoate | 0.5 |
| Trichloromonofluoromethane | 30 |
| Crude diisocyanate toluene (9 NCO functions/kg.) | 82 |

A foam containing 4.7% of phosphorus was obtained which had good properties and was classified as non-inflammable by the ASTM–D 1692–59 T test.

Example 12

A rigid polyurethane foam containing the following components was prepared.

| | Parts |
|---|---|
| Polyol obtained in Example 2 | 100 |
| Silicone lubricant (DC 113) | 2 |
| Triethylenediamine | 3 |
| Stannous octoate | 0.5 |
| Trichloromonofluoromethane | 30 |
| Prepolymer having 7.5 NCO functions per kg. (obtained from toluene diisocyanate and oxypropylated glycerine) | 96 |

A foam containing 4.4% of phosphorus and classified as non-inflammable by the ASTM–D 1692–59 T test was obtained.

Example 13

A rigid polyurethane foam was prepared from the following components:

| | Parts |
|---|---|
| Polyol obtained in Example 5 | 80 |
| Oxypropylated sorbitol (9.23 OH functions/kg.) | 20 |
| Silicone lubricant (DC 113) | 2 |
| Triethylenediamine | 3 |
| Stannous octoate | 0.5 |
| Trichloromonofluoromethane | 30 |
| Prepolymer based on toluene diisocyanate and oxypropylated glycerine | 105 |

The foam obtained contains 3.4% of phosphorus and is classified as self-extinguishable by the ASTM–D 1692–59 T test.

Example 14

A rigid polyurethane foam was prepared from the following components:

| | Parts |
|---|---|
| Polyol obtained in Example 5 | 60 |
| Oxypropylated pentaerythrite (9.6 OH/functions/kg.) | 37 |
| Silicone lubricant (DC 113) | 2 |
| Triethylenediamine | 3 |
| Stannous octoate | 0.5 |
| Trichloromonofluoromethane | 30 |
| Polyphenylenepolyisocyanate | 105 |

The foam obtained contains 2.8% of phosphorus and is classified as non-inflammable by the ASTM–D 1692–59 T test.

We claim:
1. Polyols of the formula

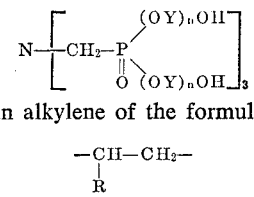

wherein Y is an alkylene of the formula

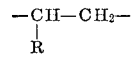

wherein R is a member selected from the group consisting of hydrogen, methyl and halomethyl, and $n$ is an integer from 1 to 10.

References Cited

UNITED STATES PATENTS

3,314,957   4/1967   Friedman _____ 260—945X

CHARLES B. PARKER, Primary Examiner

A. H. SUTTO, Assistant Examiner

U.S. Cl. X.R.

252—51, 78; 260—2.5, 30.6, 502.5 945, 978